United States Patent [19]

Goldstein

[11] Patent Number: 5,405,177

[45] Date of Patent: Apr. 11, 1995

[54] FILTER CHANGING DEVICE

[76] Inventor: Gilbert Goldstein, 49 Huntingdon Dr., Churchville, Pa. 18966

[21] Appl. No.: 176,222

[22] Filed: Jan. 3, 1994

[51] Int. Cl.⁶ .......................... A47F 13/06; B25G 1/04
[52] U.S. Cl. ........................ 294/19.1; 294/26
[58] Field of Search .................. 294/15, 19.1, 22, 24, 294/26, 34, 168; 16/115; 29/270, 278; 30/143, 151, 162; 81/177.2, 487, 488; 210/238, 541, 542; 403/104

[56] References Cited

U.S. PATENT DOCUMENTS

| | | | |
|---|---|---|---|
| 1,500,550 | 7/1924 | D'Hondt | 30/162 |
| 1,701,771 | 2/1929 | Stefano | 30/162 |
| 1,724,435 | 8/1929 | Studwell | 294/19.1 |
| 2,685,876 | 8/1954 | Sanderson | 294/19.1 X |
| 3,222,095 | 12/1965 | Gerus | 403/104 |
| 3,323,826 | 6/1967 | Crowley | 294/19.1 |
| 3,531,148 | 9/1970 | Rohde | 294/26 |
| 4,019,769 | 4/1977 | Filion | 294/19.1 |
| 5,171,052 | 12/1992 | Cunningham | 294/26 X |

FOREIGN PATENT DOCUMENTS 147457  10/1936  Austria .................. 30/162

*Primary Examiner*—Johnny D. Cherry

[57] ABSTRACT

The filter changing device is a rectangular device comprised of a rear and front piece with an elongated slot of ¼" in diameter to the front piece. This helps guide a movable insert within the rectangular device to extend to various lengths. The insert is locked in place by a ¼×20 welded stud affixed to the flexible insert. A washer and wing nut help hold the flexible insert in place to secure the front and rear piece by the means of a dimple-like indentation on left and right.

3 Claims, 2 Drawing Sheets

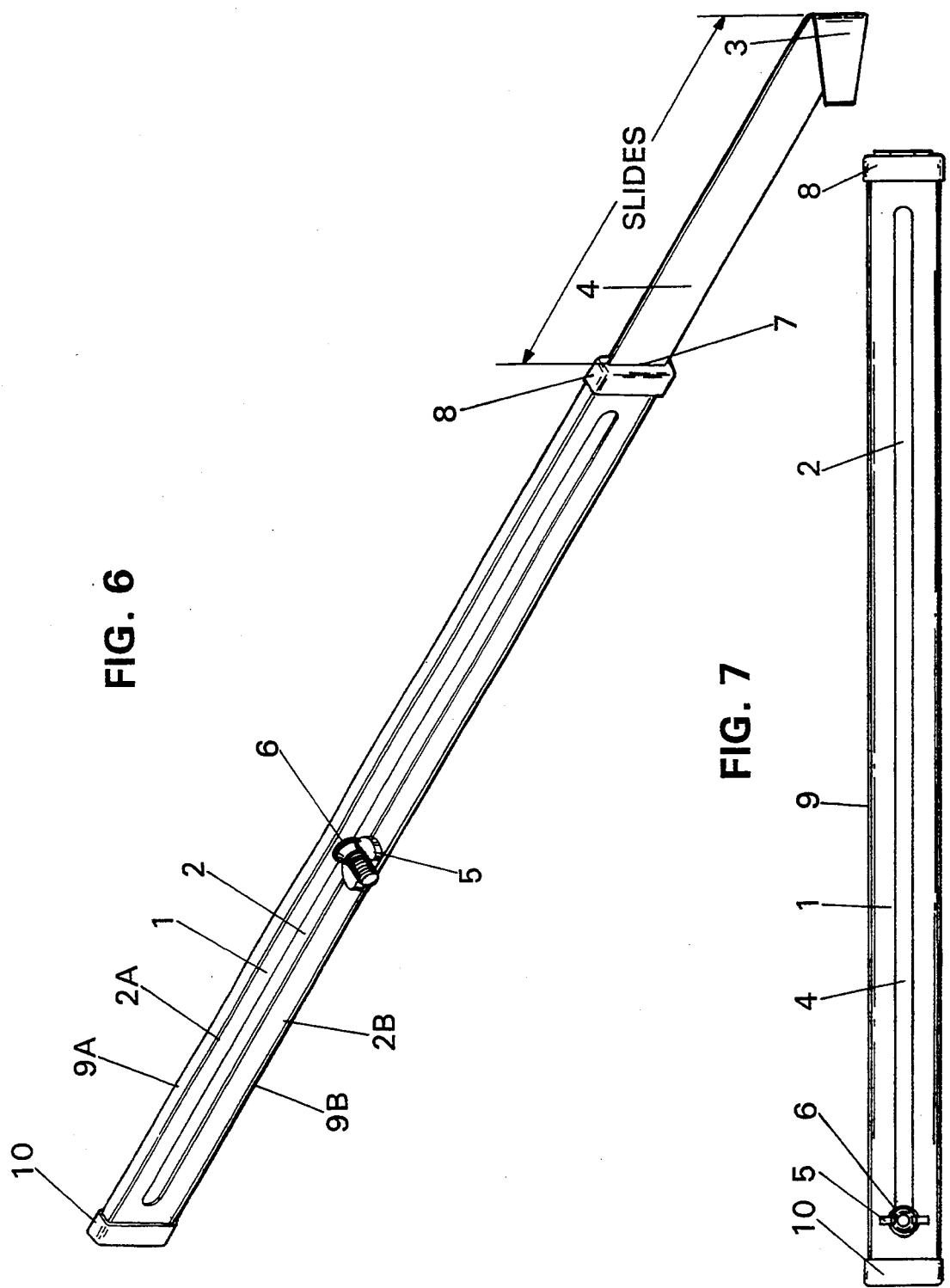

FILTER CHANGING DEVICE

BACKGROUND—FIELD OF THE INVENTION

This invention relates to heating and air conditioning filters, specifically to a new method for manually removing and replacing the air filters. This invention solves a problem that many in the air conditioning/heating field experience the removal of difficult to reach filter. Previously, many in the air conditioning/heating field used bent, metal coat hangers, in the attempt to reach the air filter. This was neither a safe or convenient method for removal/insertion of the filter. This invention solves this problem in a safe, convenient and effective manner.

BACKGROUND—DESCRIPTION OF PRIOR ART

The use of a filter changing device is not known in the prior art. Although there are products that seem similar in appearance none have been shown to be applicable to the heating/air conditioning industry.

SUMMARY OF THE INVENTION

Those skilled in the heating/air conditioning field as well as any individual who understands the difficulty in changing air filters will greatly appreciate the concept of the invention.

The general objective of the invention is to provide an effective and safe device for the use in retrieving and inserting filters/filter media that are difficult to reach due to limited space in the air conditioning, ventilation and heating systems or the distance an individual is capable of reaching for the filter/filter media with his/her hand into said systems. The invention can be made longer to desired lengths and is thinner than an arm which therefore, allows the individual to fit the said invention into tighter and/or limited spaces.

It is another object of the present invention to provide a filter changer which is of durable and reliable construction.

It is a further object of the present invention to provide a device that is simple and inexpensive which may be easily and efficiently manufactured and marketed.

An even further object of the present invention is to provide a filter changer which is susceptible of a low cost of manufacture with regard to both materials and labor, and which accordingly is then susceptible of low prices of sale to the consuming public, thereby making such devices economically available to the buying public.

Still another object of the present invention is to provide a device to minimize problems in retrieving air filters/filter media.

A further object is to provide such a device in light weight form that can be transferred easily from job to job.

BRIEF DESCRIPTION OF DRAWINGS

FIG. 6 illustrates the assembled filter changing device in its entirety.

FIG. 7 is a sectional view taken on the plane, enlarged to show detail.

DESCRIPTION OF PREFERRED EMBODIMENT

Figures 1, 2, 3, 4, 5:
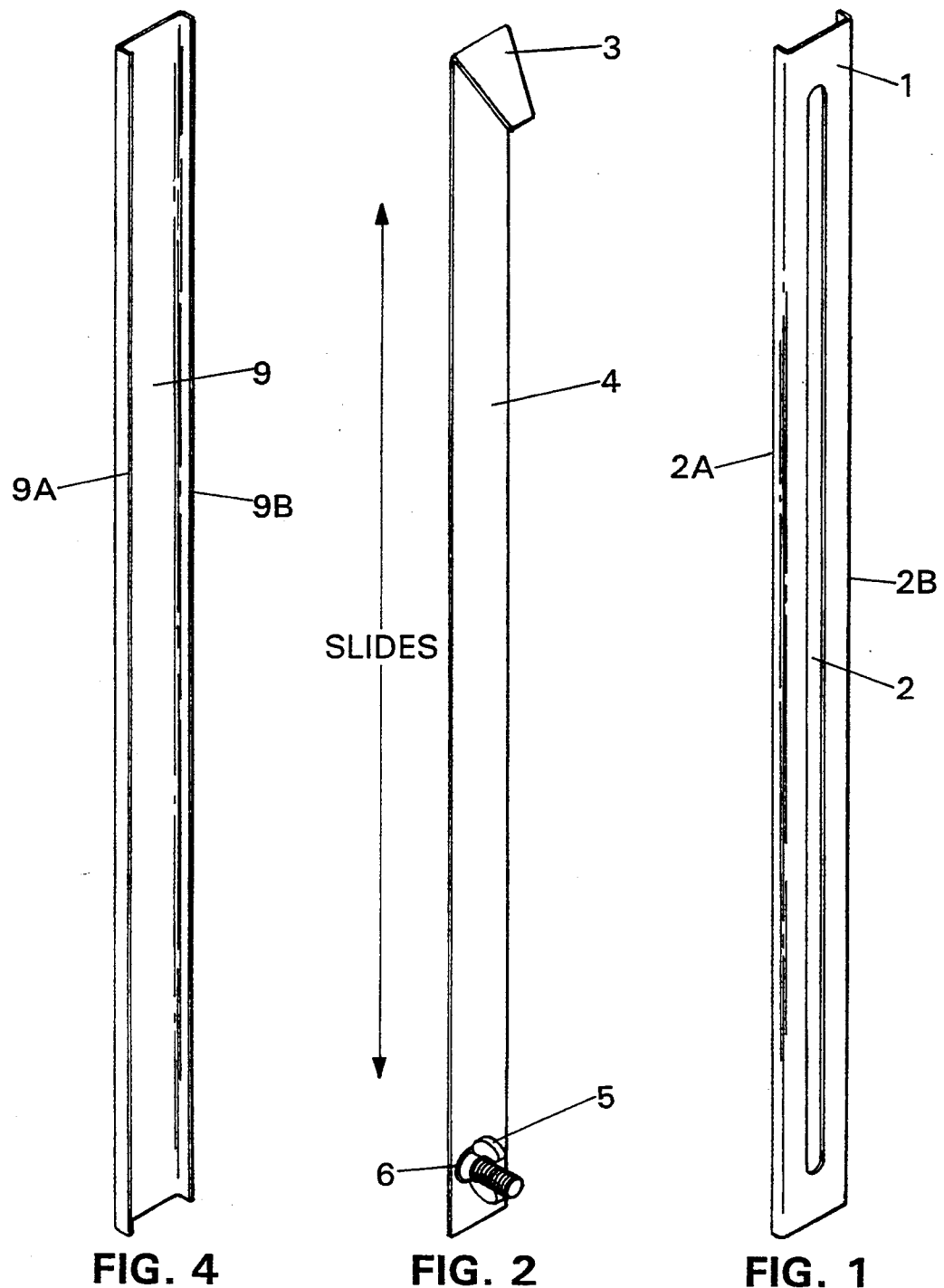
FIG. 1 is a perspective view of the rectangular front cover.
FIG. 2 is a view of the angled slider portion of the invention.
FIG. 3 represents the top end cap, one of two.
FIG. 4 is the front elevation view of the back cover.
FIG. 5 is the second end cap that is placed on the bottom of the device.

FIG. 1 illustrates the front cover 1 in which a cut slot 2 is centered and two bent edges 2A and 2B run the length of the cover 1.

FIG. 2 represents the angled end 3 of the slider 4 to which a washer 6 and wing nut 5 are attached. Hooked end 3 is used to engage filters for removal or insertion.

Shown in FIG. 3 is the top end cap 8 into which a slot 7 is cut to allow the slider 4, shown in FIG. 2, to pass through easily.

FIG. 4 shows the rear cover 9 which has two bent edges 9A and 9B running the length thereof.

FIG. 5 is similar to FIG. 3 to the effect that an end cap is shown; in this illustration the bottom end cap 10 is portrayed.

FIG. 6 illustrates the assembled device with the components functioning as follows: the front cover 1 and rear cover 9 fitting snugly together with the aid of the bent edges 2A, 2B, 9A, 9B, thus encasing the slider 4, that contains a bent angle 3, which passes through the top end cap slot 7 that along with the bottom end cap 10 aids in holding the front and rear covers 1,9 together. The wing nut 5 and washer 6 enable the slider 4 to be set to various lengths. The device in this entirety permits a person to change a filter with safety and ease.

FIG. 7 illustrates the plane view of the filter changing device. This shows an enlarged view of the front cover 1 with slot 2, rear cover 9 and the top and bottom end caps 8, 10.

An individual would grasp the filter changing device in his/her hand and adjust angled slider 4 to desired length by tightening the wing nut 5 and washer 6 assembly. The individual would then point the angled end 3 towards filter media, engage to filter media and then retrieve it.

I claim:

1. A device for removing and replacing filters comprising an elongated member having a hook on one end thereof, said member being slidably mounted in an elongated cover, said cover including substantially flat front and back members, an elongated slot extending along the length of said front member of said cover, a wing nut assembly extending through such slot for engagement with said elongated member to selectively adjust the overall length of said device, said hook being engagable with a filter for insertion or removal thereof, and a protective end cap being mounted on each end of said cover.

2. A device as recited in claim 1 wherein said cover is made of plastic.

3. A device as recited in claim 1 wherein said device is formed of metal.

* * * * *